UNITED STATES PATENT OFFICE.

FRANK D. WOLFGRAM, OF MILWAUKEE, WISCONSIN, ASSIGNOR OF ONE-HALF TO FREDERICK M. HASSE, OF MILWAUKEE, WISCONSIN.

DUST-ABSORBING COMPOUND.

No. 893,484.   Specification of Letters Patent.   Patented July 7, 1908.

Application filed January 16, 1907. Serial No. 352,536.

*To all whom it may concern:*

Be it known that I, FRANK D. WOLFGRAM, residing in Milwaukee, in the county of Milwaukee and State of Wisconsin, have invented new and useful Improvements in Dust-Absorbing Compounds, of which the following is a description.

My invention has relation to improvements in dust absorbing compounds.

The object of the invention is to produce an efficient dust-absorbing compound especially adapted for use in preventing dust from rising during the operation of sweeping floors, or other surfaces, and also susceptible of use to great advantage in connection with the form of construction of dustless brush covered in the application for patent Serial No. 352,537, filed Jan. 16, 1907.

My improved compound consists of sawdust, lard, coarse salt, and oil, and in preparing the compound I take a suitable quantity of sawdust or finely comminuted wood, preferably red cedar, and treat it with lard so as to impart to it the required degree of consistency, about five per cent. of lard or tallow is mixed with the sawdust to give it this required consistency for absorbing and taking up dust. The sawdust so treated is then mixed with ten per cent. of coarse salt and with ten to fifteen per cent. of oil. If desired, formaldehyde, about two per cent. may be added, and also about one-half of one per cent. of an aromatic such as a mixture of oil of fennel, oil of anise and terpinol. The compound, after the ingredients enumerated have been thoroughly commingled and mixed, is then ready for use.

The character of oil I prefer to use is a paraffin distillate known as paraffin oil. I do not, however, wish to restrict myself to this particular character of oil, as common kerosene oil, or any other desirable oil, may be employed, although paraffin oil has been found to give exceedingly satisfactory results as it not only adds certain antiseptic qualities to the compound, but it also, in connection with the salt and other ingredients, enables the compound to take up the dust most effectively.

The lard used in the compound not only imparts the proper amount of consistency, but it also assists in gathering up the dust, and in connection with the oil gives to the sawdust the maximum dust taking up qualities.

The salt is used as an ingredient of the compound for the purpose of increasing the weight and compelling the sawdust to drop by reason of the additional weight imparted thereto.

The formaldehyde when added acts as a germ killer, and the aromatic gives a pleasant odor to the compound.

I claim

1. The herein described dust absorbing compound, comprising sawdust or finely comminuted wood treated with and containing lard, and mixed with salt and oil.

2. The herein described dust absorbing compound, comprising finely comminuted red cedar or red cedar sawdust treated with and containing lard and mixed with salt and oil.

3. The herein described dust absorbing compound, comprising sawdust or finely comminuted wood treated with and containing lard, and mixed with salt and paraffin oil.

4. The herein described dust absorbing compound, comprising sawdust or finely comminuted wood treated with and containing lard, and mixed with ten per cent. salt and ten to fifteen per cent. oil.

5. The herein described dust absorbing compound comprising finely comminuted red cedar or red cedar sawdust treated with and containing lard, and mixed with ten per cent. coarse salt and ten to fifteen per cent. of paraffin oil.

6. The herein described dust absorbing compound, comprising sawdust or finely comminuted wood treated with and containing lard, and mixed with salt, oil, and formaldehyde.

7. The herein described dust absorbing compound, comprising sawdust or finely comminuted wood treated with and containing lard, and mixed with salt, oil, and a suitable aromatic.

8. The herein described dust absorbing compound, consisting of sawdust or finely comminuted wood treated with and containing lard, and mixed with salt, oil, formaldehyde and a suitable aromatic.

In testimony whereof, I affix my signature, in presence of two witnesses.

FRANK D. WOLFGRAM.

Witnesses:
ANNA F. SCHMIDTBAUER,
A. L. MORSELL.